(12) United States Patent
Deng et al.

(10) Patent No.: US 11,509,767 B2
(45) Date of Patent: Nov. 22, 2022

(54) STATUS PROMPT MULTIMEDIA PLAYING METHOD AND SYSTEM, AND APPARATUS

(71) Applicant: HUAWEI TECHNOLOGIES CO., LTD., Guangdong (CN)

(72) Inventors: Zhilei Deng, Nanjing (CN); Bin Meng, Beijing (CN); Changyue Xu, Nanjing (CN); Shisheng Wu, Nanjing (CN); Dong Wang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/200,285

(22) Filed: Mar. 12, 2021

(65) Prior Publication Data
US 2021/0203777 A1 Jul. 1, 2021

Related U.S. Application Data

(63) Continuation of application No. PCT/CN2019/107352, filed on Sep. 23, 2019.

(30) Foreign Application Priority Data

Oct. 9, 2018 (CN) .......................... 201811173742.9

(51) Int. Cl.
*H04M 3/428* (2006.01)
*H04M 3/48* (2006.01)
*H04M 3/537* (2006.01)

(52) U.S. Cl.
CPC ....... *H04M 3/4288* (2013.01); *H04M 3/4285* (2013.01); *H04M 3/48* (2013.01); *H04M 3/537* (2013.01)

(58) Field of Classification Search
CPC .... H04M 3/4288; H04M 3/4285; H04M 3/48; H04M 3/537
(Continued)

(56) References Cited

U.S. PATENT DOCUMENTS

| 6,014,434 A | 1/2000 | Kim |
| 2008/0108334 A1* | 5/2008 | Wang ................ H04M 3/42017 455/414.1 |

(Continued)

FOREIGN PATENT DOCUMENTS

| CN | 1658632 A | 8/2005 |
| CN | 1725790 A | 1/2006 |

(Continued)

OTHER PUBLICATIONS

Office Action issued in Chinese Application No. 2018111737429, dated Aug. 9, 2021, 6 pages (With English Translation).

(Continued)

*Primary Examiner* — Ahmad F. Matar
*Assistant Examiner* — Jirapon Intavong
(74) *Attorney, Agent, or Firm* — Fish & Richardson P.C.

(57) ABSTRACT

Example status prompt multimedia playing methods and apparatus are described. One example method includes receiving a first multimedia request by a status prompt application server, where the first multimedia request includes a non-idle identifier and is sent by a TAS. The status prompt application server sends a first multimedia response including a status prompt multimedia session description protocol (SDP) to the TAS, and receives a first multimedia acknowledgement message that includes a calling-side multimedia SDP and that is sent by the TAS. In this way, the status prompt application server obtains the calling-side multimedia SDP, and implements negotiation and acknowledgement of multimedia capability sets between the status prompt application server and a calling terminal device. The status prompt application server can play corresponding status prompt multimedia for the calling terminal device based on different non-idle identifiers. This implements (Continued)

playing of personalized status prompt multimedia in a non-idle state scenario.

18 Claims, 10 Drawing Sheets

(58) Field of Classification Search
USPC .................................................. 379/215.01
See application file for complete search history.

(56) References Cited

U.S. PATENT DOCUMENTS

2009/0238353 A1 9/2009 Mani
2017/0006156 A1 1/2017 Zampiello

FOREIGN PATENT DOCUMENTS

| CN | 1758687 A | 4/2006 | |
|---|---|---|---|
| CN | 1852360 A | 10/2006 | |
| CN | 1852363 A | 10/2006 | |
| CN | 1859482 A | 11/2006 | |
| CN | 1913557 A | 2/2007 | |
| CN | 101076198 A | 11/2007 | |
| CN | 101699882 A | 4/2010 | |
| CN | 103888622 A | 6/2014 | |
| CN | 105979106 A | 9/2016 | |
| CN | 106027817 A | 10/2016 | |
| CN | 106303104 A | 1/2017 | |
| CN | 106713679 A | 5/2017 | |
| EP | 1613046 A1 | 1/2006 | |
| EP | 2157767 A1 * | 2/2010 | ............ H04M 7/129 |
| EP | 2157767 A1 | 2/2010 | |
| EP | 2299670 A1 | 3/2011 | |
| KR | 20050116251 A | 12/2005 | |
| WO | 2009077877 A2 | 6/2009 | |

OTHER PUBLICATIONS

3GPP TS 24.182 V14.2.0 (Mar. 2018), "3rd Generation Partnership Project; Technical Specification Group Core Network and Terminals; IP Multimedia Subsystem (IMS) Customized Alerting Tones (CAT); Protocol specification (Release 14)," Mar. 2018, 144 pages.
Office Action issued in Chinese Application No. 201811173742.9 dated Sep. 24, 2020, 24 pages (with English translation).
PCT International Search Report and Written Opinion issued in International Application No. PCT/CN2019/107352 dated Dec. 12, 2019, 17 pages (with English translation).
Extended European Search Report issued in European Application No. 19872145.8 dated Aug. 6, 2021, 10 pages.

* cited by examiner

STATUS PROMPT MULTIMEDIA PLAYING METHOD AND SYSTEM, AND APPARATUS

CROSS-REFERENCE TO RELATED APPLICATIONS

This application is a continuation of International Patent Application No. PCT/CN2019/107352, filed on Sep. 23, 2019, which claims priority to Chinese Patent Application No. 201811173742.9, filed on Oct. 9, 2018. The disclosures of the aforementioned applications are hereby incorporated by reference in their entireties.

TECHNICAL FIELD

This application relates to the field of communications technologies, and in particular, to a status prompt multimedia playing method and system, and an apparatus.

BACKGROUND

Currently, a ring back tone service is a mature telecommunications value-added service. The current ring back tone service (including a video ring back tone service) is only provided in a scenario in which a called party is in a service area of a network and is idle. In other words, a calling party can experience the ring back tone service only when the called party is idle. When the called party is in another status (such as in a power-off state, a user busy state, or arrears) or is using a supplementary service (such as a call waiting service or a call hold service), a called-side network plays a non-customized power-off tone or a busy tone for the calling party. Consequently, the calling party cannot hear a personalized ring back tone, and the called party cannot customize the personalized ring back tone to be used when the called party is in such a non-idle state.

SUMMARY

Embodiments of this application provide a status prompt multimedia playing method and system, a telephony application server, and a status prompt application server, so that a called party customizes personalized status prompt multimedia for use in a non-idle state, and a calling party can hear or see the personalized status prompt multimedia that have been customized by the called party for use in the non-idle state. This enriches telecommunications services and improves user experience.

According to a first aspect, an embodiment of this application provides a status prompt multimedia playing method, including: receiving a call request sent by a calling terminal device to a called terminal device; and when a telephony application server (TAS) determines that the called terminal device is in a non-idle state and that a called party of the called terminal device has customized personalized status prompt multimedia, sending a first multimedia request to a status prompt application server, so that multimedia capability negotiation between the status prompt application server and the calling terminal device can be triggered and implemented, and the status prompt application server plays the status prompt multimedia for the calling terminal device. In this way, a called party can customize the personalized status prompt multimedia for use in a non-idle state, and a calling party can hear or see the personalized status prompt multimedia that have been customized by the called party for use in the non-idle state. This enriches telecommunications services and improves user experience.

In a feasible implementation, a specific process of implementing multimedia capability negotiation between the status prompt application server and the calling terminal device may include: receiving, by the TAS, a first multimedia response sent by the status prompt application server, where the first multimedia response includes a multimedia capability set of the status prompt application server, and the multimedia capability set may be carried in a status prompt multimedia session description protocol (SDP); sending, by the TAS, a second multimedia request including the multimedia capability set of the status prompt application server to the calling terminal device; receiving a second multimedia response that includes a multimedia capability set of the calling terminal device and that is sent by the calling terminal device, where the multimedia capability set of the calling terminal device is carried in a calling-side multimedia SDP; and sending, by the TAS, a first multimedia acknowledgement message including the multimedia capability set of the calling terminal device to the status prompt application server. In this way, the status prompt application server obtains the multimedia capability set of the calling terminal device, implements negotiation and acknowledgement of the multimedia capability sets between the status prompt application server and the calling terminal device, and can play the status prompt multimedia for the calling terminal device.

In a feasible implementation, before the sending a first multimedia request to a status prompt application server, the method further includes: sending, by the TAS, a call response including an early media identifier to the calling terminal device, to restrain the calling terminal device from playing a common tone. In this process, not only a procedure of making a voice call by the calling terminal device is implemented, but also the calling terminal device can be restrained from playing the common tone.

In a feasible implementation, the method further includes: sending, by the TAS, a notification message to the status prompt application server, where the notification message includes an indication of playing the status prompt multimedia. In this way, the status prompt application server can play the status prompt multimedia for the calling terminal according to the indication.

It should be understood that a process of determining that the called terminal device is in the non-idle state varies with different non-idle states. For example, the process includes: receiving a call busy message, a call waiting message, or a call hold message sent by the called terminal device, and determining, based on the call busy message or the call waiting message, that the called terminal device is in the non-idle state; or determining, based on whether the called terminal device is in a power-off state, an incoming call barring state, an anti-fraud state, an owed restriction state, or a terminating call barring state, that the called terminal device is in the non-idle state; or when a fault occurs on a network, determining that the called terminal device is in the non-idle state.

It should be understood that, the first multimedia request may include a status prompt identifier and a non-idle identifier, and the non-idle identifier is specifically a call busy identifier, a power-off identifier, a call waiting identifier, a call hold identifier, a network busy identifier, a network fault identifier, an incoming call barring identifier, an anti-fraud identifier, an owed restriction identifier, or a terminating call barring identifier. The status prompt application server may play different status prompt multimedia based on different non-idle identifiers. The status prompt identifier may identify the personalized status prompt multimedia that have been customized by the called party. In this way, the status prompt application server is triggered to perform a related operation of playing the status prompt multimedia.

It should be understood that the status prompt identifier and the non-idle identifier may be carried in different header fields of the first multimedia request. For example, the status prompt identifier may be carried in a contact header field, and the non-idle identifier may be carried in an alert-info header field.

According to a second aspect, an embodiment of this application provides a status prompt multimedia playing method. The method may be performed by a status prompt application server, and specifically includes: receiving a first multimedia request that includes a non-idle identifier and that is sent by a TAS; and implementing multimedia capability negotiation with a calling terminal device, so that the status prompt application server can play corresponding status prompt multimedia for the calling terminal device based on different non-idle identifiers. This implements playing of personalized status prompt multimedia in a non-idle state scenario. There may be a plurality of types of non-idle identifiers. For example, the non-idle identifier may be specifically a call busy identifier, a power-off identifier, a call waiting identifier, a call hold identifier, a network busy identifier, a network fault identifier, an incoming call barring identifier, an anti-fraud identifier, an owed restriction identifier, or a terminating call barring identifier. The first multimedia request may further carry a status prompt identifier, and the status prompt identifier may identify the personalized status prompt multimedia that have been customized by a called party. The status prompt identifier and the non-idle identifier may be carried in different header fields of the first multimedia request. For example, the status prompt identifier may be carried in a contact header field, and the non-idle identifier may be carried in an alert-info header field.

In a feasible implementation, the process of implementing, by the status prompt application server, multimedia capability negotiation with a calling terminal device may include: sending, by the status prompt application server, a first multimedia response to the TAS, where the first multimedia response includes a multimedia capability set of the status prompt application server, and the multimedia capability set may be carried in a status prompt multimedia SDP; and receiving a first multimedia acknowledgement message sent by the TAS, where the first multimedia acknowledgement message includes a multimedia capability set of the calling terminal device, and the multimedia capability set may be carried in a calling-side SDP.

In a feasible implementation, there are two manners of playing the status prompt multimedia corresponding to the non-idle identifier for the calling terminal device. In a first manner, the status prompt application server receives a notification message sent by the TAS, where the notification message includes an indication of playing the status prompt multimedia, and plays, according to the indication, the status prompt multimedia corresponding to the non-idle identifier for the calling terminal device. In a second manner, the status prompt application server starts a timer after receiving the first multimedia acknowledgement message; and when the timer expires, plays the status prompt multimedia corresponding to the non-idle identifier for the calling terminal device.

According to a third aspect, an embodiment of this application provides a telephony application server, including several functional modules configured to implement any method in the first aspect. For example, the telephony application server may include: a receiving module, configured to receive a call request sent by a calling terminal device to a called terminal device; a determining module, configured to determine that the called terminal device is in a non-idle state and that the called party of the called terminal device has customized personalized status prompt multimedia; and a sending module, configured to send a first multimedia request to a status prompt application server, to implement multimedia capability negotiation between the status prompt application server and the calling terminal device, so that the status prompt application server plays the personalized status prompt multimedia for the calling terminal device.

According to a fourth aspect, an embodiment of this application provides a status prompt application server, including several functional modules configured to implement any method in the second aspect. For example, the status prompt application server may include: a request module, configured to receive a first multimedia request sent by a telephony application server TAS, where the first multimedia request includes a status prompt identifier and a non-idle identifier; a negotiation module, configured to implement multimedia capability negotiation with a calling terminal device; and a playing module, configured to play status prompt multimedia corresponding to the non-idle identifier for the calling terminal device. The negotiation module may be configured to: send a first multimedia response to the TAS based on the status prompt identifier, where the first multimedia response includes a multimedia capability set of the status prompt application server; and receive a first multimedia acknowledgement message sent by the TAS, where the first multimedia acknowledgement message includes a multimedia capability set of the calling terminal.

According to a fifth aspect, an embodiment of this application provides a status prompt multimedia playing system, including the telephony application server in the third aspect and the status prompt application server in the fourth aspect.

According to a sixth aspect, an embodiment of this application provides a computer device, including a non-volatile memory and a processor that are coupled to each other. The processor invokes program code stored in the memory, to perform some or all steps of any method in the first aspect.

According to a seventh aspect, an embodiment of this application provides a computer device, including a non-volatile memory and a processor that are coupled to each other. The processor invokes program code stored in the memory, to perform some or all steps of any method in the second aspect.

According to an eighth aspect, an embodiment of this application provides a computer-readable storage medium. The computer-readable storage medium stores program code. The program code includes an instruction used to perform some or all steps of any method in the first aspect.

According to a ninth aspect, an embodiment of this application provides a computer-readable storage medium. The computer-readable storage medium stores program code. The program code includes an instruction used to perform some or all steps of any method in the second aspect.

According to a tenth aspect, an embodiment of this application provides a computer program product. When the computer program product runs on a computer, the computer is enabled to perform some or all steps of any method in the first aspect.

According to an eleventh aspect, an embodiment of this application provides a computer program product. When the computer program product runs on a computer, the computer is enabled to perform some or all steps of any method in the second aspect.

It should be understood that the technical solutions in the third, sixth, eighth, and tenth aspects of this application are consistent with the technical solutions in the first aspect of this application, and beneficial effects achieved in each of the aspects and corresponding feasible implementations of the aspects are similar; and the technical solutions in the fourth, seventh, ninth, and eleventh aspects of this application are consistent with the technical solutions in the second aspect of this application, and beneficial effects achieved in each of the aspects and corresponding feasible implementations of the aspects are similar. Therefore, details are not described again.

BRIEF DESCRIPTION OF DRAWINGS

To describe the technical solutions in the embodiments of this application or in the background more clearly, the following briefly describes the accompanying drawings for describing the embodiments of this application or the background.

DESCRIPTION OF EMBODIMENTS

The following describes the embodiments of this application with reference to the accompanying drawings in the embodiments of this application.

To help a person skilled in the art understand the technical solutions in the present invention better, the following clearly describes the technical solutions in the embodiments of the present invention with reference to the accompanying drawings in the embodiments of the present invention. It is clear that the described embodiments are merely some rather than all of the embodiments of the present invention. All other embodiments obtained by a person of ordinary skill in the art based on the embodiments of the present invention without creative efforts shall fall within the protection scope of the present invention.

Figure 1A:
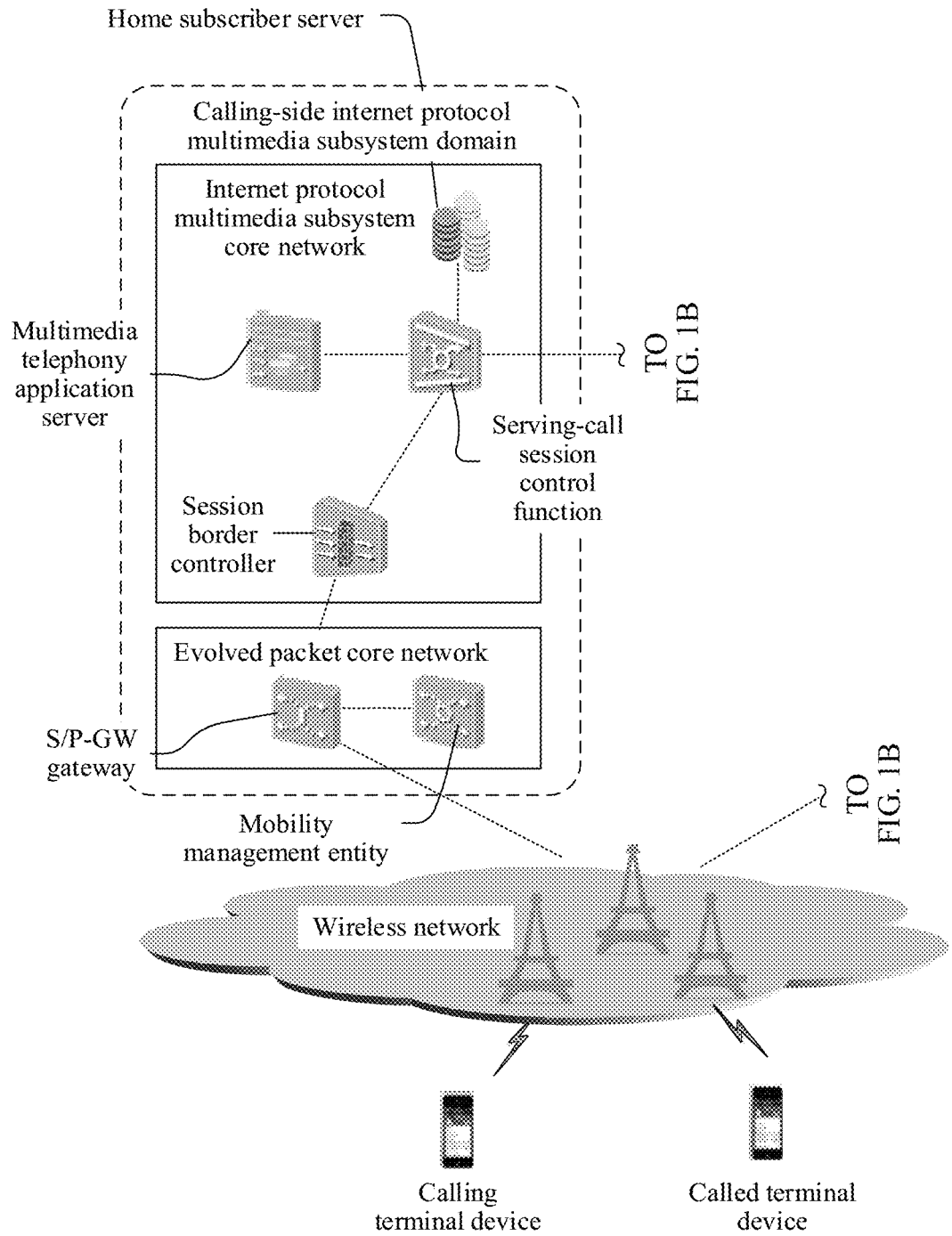
FIG. 1A and FIG. 1B are a schematic block diagram of a status prompt multimedia playing system according to an embodiment of this application.
Figure 1B:
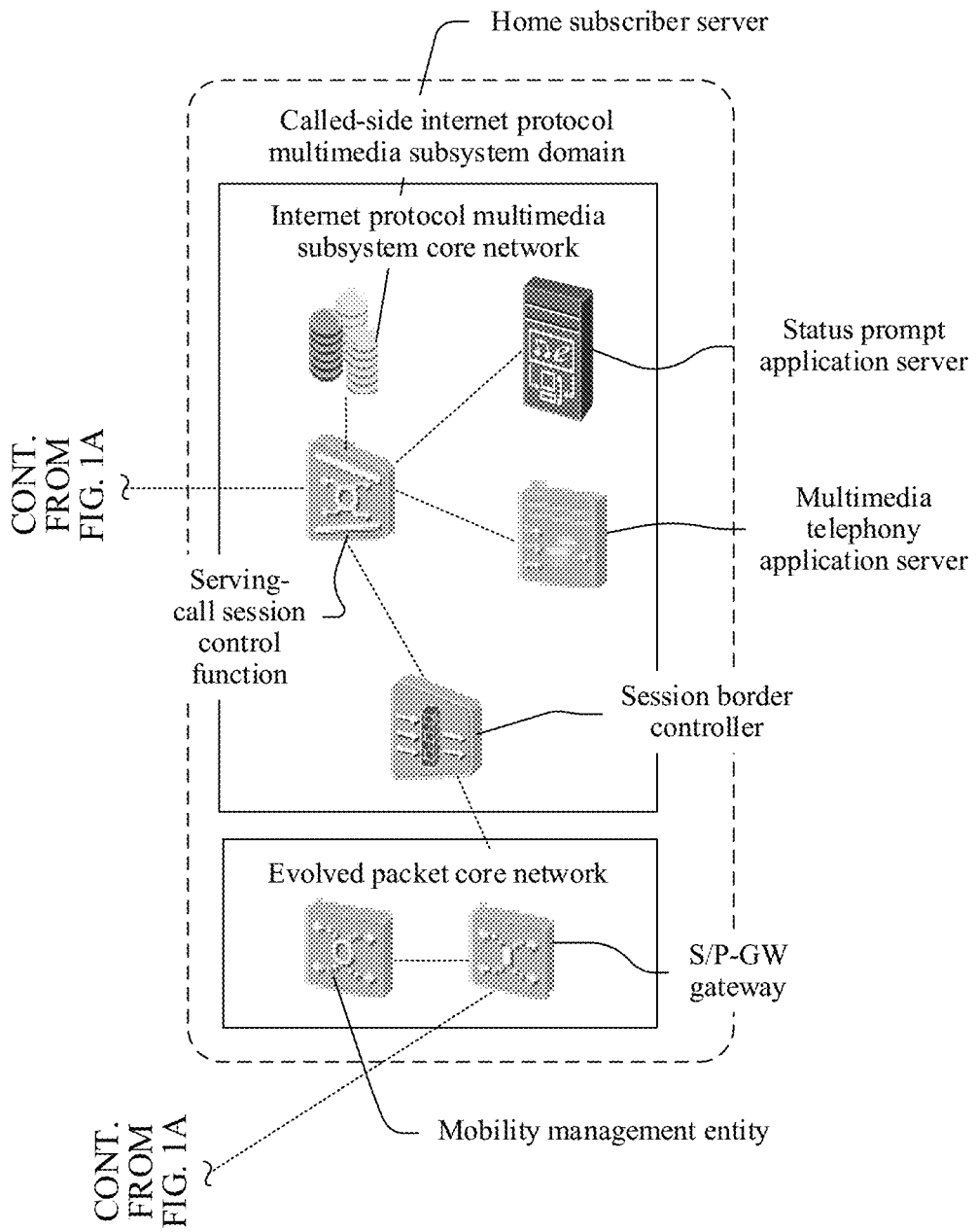

The embodiments of this application may be applicable to a network architecture based on a second generation mobile communications technology (2G), a network architecture based on a third generation mobile communications technology (3G), a network architecture based on a fourth generation mobile communications technology (4G), a network architecture based on a fifth generation mobile communications technology (5G), and a future network. For ease of description, the following describes a network architecture and a method procedure of the solutions by using a 4G network architecture as an example. The technical solutions of the present invention are applied to a basic VoLTE network architecture, as shown in FIG. 1A and FIG. 1B. FIG. 1A and FIG. 1B are a diagram of a system architecture according to an embodiment of the present invention. The system architecture may include a calling terminal device, a called terminal device, a wireless network, a calling-side internet protocol (IP) multimedia subsystem (IP Multimedia Subsystem, IMS) domain network, and a called-side IMS domain network. The calling-side IMS domain may include a calling-side IMS core network and an evolved packet core (EPC) network. The calling-side IMS core network includes a serving-call session control function (S-CSCF), an interrogating-call session control function (I-CSCF), a proxy-call session control function (P-CSCF), a home subscriber server (HSS), a session border controller (SBC), and several dedicated application servers (AS). The I-CSCF and the S-CSCF may be integrated together, and referred to as "I/S-CSCF" for short. The SBC and the P-CSCF may be integrated together, and referred to as "SBC/P-CSCF" for short. In addition to network elements same as those included in the calling-side IMS domain, the called-side IMS domain may further include a status prompt application server. The status prompt application server may be considered as a dedicated application server, and may be integrated with a ring back tone application server, or may be an independent network element. It should be noted that the foregoing description does not constitute a limitation on a diagram of a system architecture in the embodiments of the present invention, and the diagram of the system architecture in the embodiments of the present invention includes but is not limited to the system architecture shown in FIG. 1A and FIG. 1B. The application servers in this embodiment of the present invention may be specifically a multimedia telephony application server (MMTel AS) and a status prompt application server. The EPC includes a packet data network gateway (P-GW), a serving gateway (S-GW), and a mobility management entity (MME). The P-GW and the S-GW may be integrated together, and referred to as an "S/P-GW" for short. As an important telecommunications value-added service platform, a ring back tone platform may include a ring back tone application server (RBT AS) and a ring back tone media resource server (RBT MRS). It should be noted that the RBT AS and the RBT MRS may be independent entities, or may be integrated but are two logically independent modules, and are located on a called-side IMS core network. A signaling plane of the ring back tone platform is connected to an S-CSCF on the called side core network, and a media plane of the ring back tone platform is connected to an SBC on the core network, to play a ring back tone for a calling party.

Functions of the foregoing network elements (except the dedicated application server) are all standard network elements on a communications network. Details are not described, and only brief descriptions are provided herein. For example, the S-CSCF may be used for user registration, authentication control, session routing, service trigger control, and maintaining of session status information. The I-CSCF may be used for assignment and query of an S-CSCF with which a user registers. The P-CSCF may be used as a proxy for signaling and a message. The HSS may be configured to store user subscription information and location information. The SBC may provide secure access and media processing. The MME is a core device on the EPC network. The S-GW may be used for a connection between the IMS core network and the wireless network, and the P-GW may be used for a connection between the IMS core network and an IP network. The status prompt application server may provide a user with a service of customizing a personalized video prompt tone in a call state (such as a power-off state, a user busy state, or a call waiting state) scenario, for example, playing a video image together with a voice prompt "The subscriber you dialed is powered off, please redial later!" A call procedure in a scenario in which a called party is in a non-idle state (such as in a power-off state, a user busy state, or a call waiting state) is improved, and a telephony application server (TAS) is used to control the status prompt application server to play personalized status prompt multimedia. This changes a conventional manner of playing a default status voice-prompt tone. The TAS may also be integrated with the MMTel AS or another server set with a similar function. The status prompt application server may be an independent entity, or may be implemented through an AS that provides an existing service, provided that the AS has a capability of implementing a status prompt multimedia service. The status prompt application server may alternatively be integrated with the RBT MRS. In some other cases, the status prompt application server may alternatively be integrated with the TAS. In this case, interaction between the status prompt application server and the TAS is internal interaction of an entity obtained after the integration.

A terminal device is a device having a wireless transceiver function. The terminal device may be deployed on land, including an indoor device, an outdoor device, a handheld device, or a vehicle-mounted device; or may be deployed on a water surface (for example, on a ship); or may be deployed in the air (for example, on a plane, a balloon, or a satellite). Specifically, the terminal device may be a terminal device that can access a mobile network, a mobile phone, a tablet computer (pad), a computer with a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in smart grid, a wireless terminal in transportation safety, a wireless terminal in smart city, a wireless terminal in smart home, or the like.

Figure 2A:
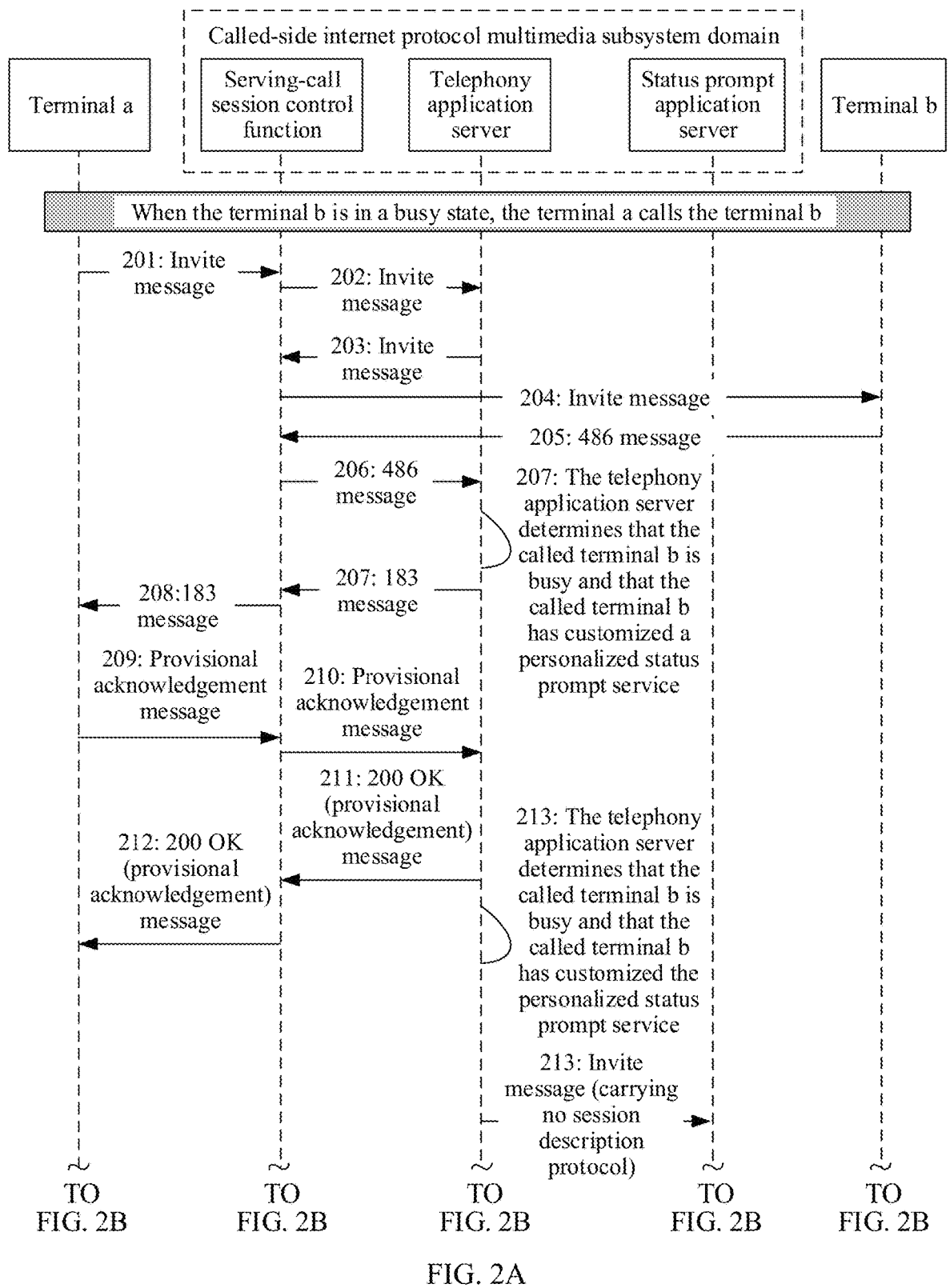
FIG. 2A and FIG. 2B are a flowchart of a status prompt playing method when a called party is in a busy state according to an embodiment of this application.
Figure 2B:
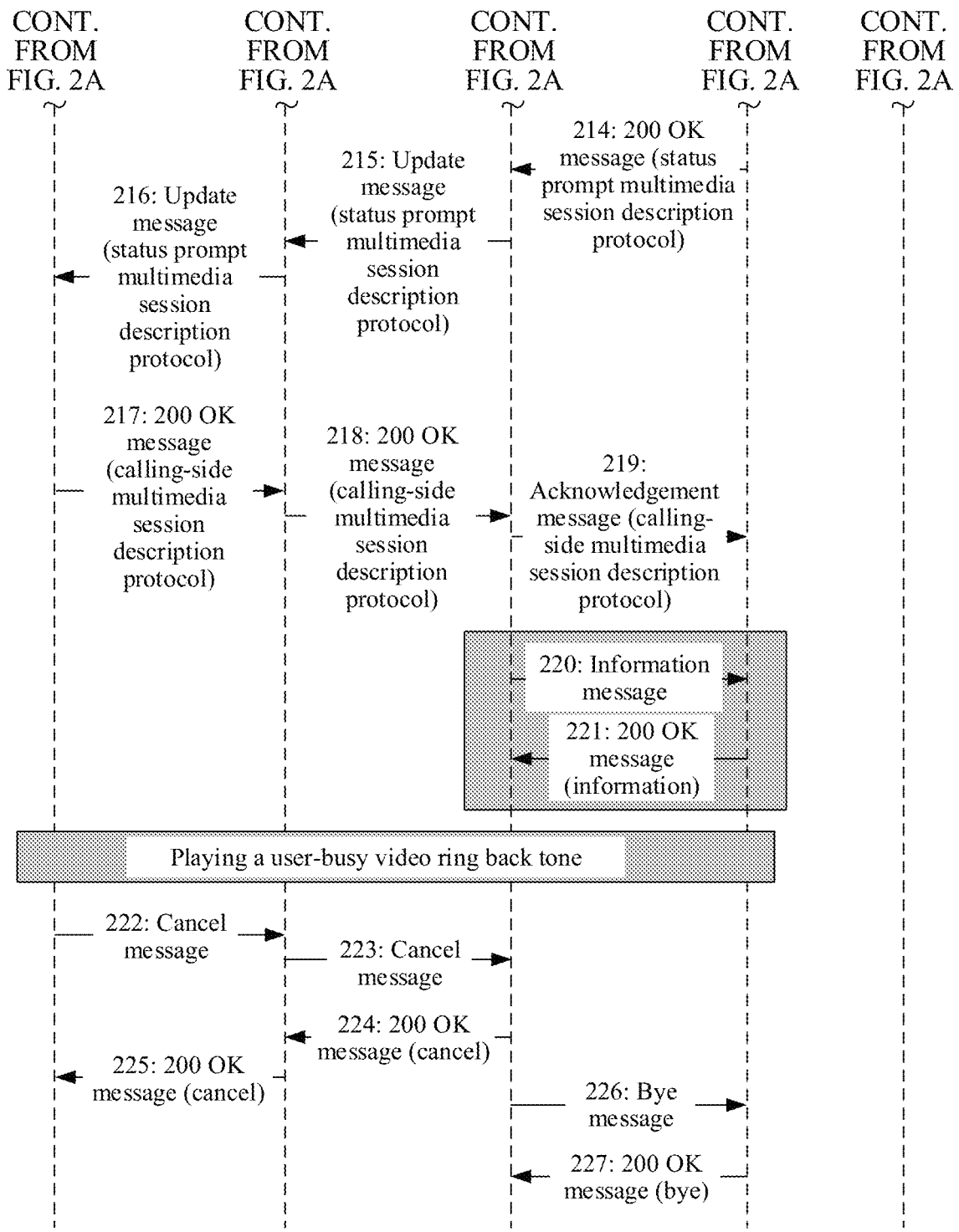

FIG. 2A and FIG. 2B are a schematic flowchart of a status prompt multimedia playing method 200 according to this application. The following describes a call procedure in which a status prompt application server plays personalized status prompt multimedia after the solution is implemented. The method 200 may be applied to a wireless network architecture in FIG. 1A and FIG. 1B. Certainly, the method 200 may also be applied to another communication scenario. This is not limited in the embodiments of this application. A terminal A is a calling terminal device, a terminal B is a called terminal device, and the terminal B is in a busy state. To simplify a description, only the terminal A is shown on a calling side in FIG. 2A and FIG. 2B, and interaction between the terminal A and each network element in a calling-side IMS domain is not described herein. Network elements in a called-side IMS domain in FIG. 2A and FIG. 2B include an S-CSCF, a TAS, and a status prompt application server. An interaction procedure between a network element, not shown in FIG. 2A and FIG. 2B, in the called-side IMS domain and a network element, shown in FIG. 2A and FIG. 2B, in the called-side IMS domain is omitted in FIG. 2A and FIG. 2B. The procedure specifically includes the following steps.

Step 201: When the terminal A initiates a voice call to the terminal b, the terminal A sends a call request to the called-side S-CSCF through a calling-side S-CSCF, where the call request may include a calling number and a called number, and the call request may be specifically an invite message. The following provides descriptions by using the invite message as an example.

Step 202: The called-side S-CSCF receives the invite message sent by the terminal a, and the called-side S-CSCF sends the invite message to the TAS.

Step 203: After receiving the invite message, the TAS sequentially matches, based on a preconfigured service execution sequence relationship, trigger conditions set in different service data, and executes a corresponding service based on a result of whether a trigger condition is matched successfully. For example, two services are preconfigured: a service 1 is to check whether the called number is in arrears, and a service 2 is to trigger to call the called number; and the service 2 is triggered only when it is determined, based on the service 1, that the called number is not in arrears. In this case, the TAS first determines whether the called number included in the invite message is in arrears (the service 1). If the called number is not in arrears, the TAS sends the invite message (the service 2) to the called-side S-CSCF. If the called number is in arrears, the TAS terminates the call. The following further describes the solution by using an example in which the called number is not in arrears.

Step 204: After receiving the invite message sent by the TAS, the called-side S-CSCF sends the invite message to the terminal b, to call the terminal b.

Step 205: The terminal B receives the invite message. Because the terminal B is in the busy state, the terminal B is unable to connect the call. In this case, the terminal B sends a call busy message to the called-side S-CSCF, where the call busy message may be a 486 message, and the 486 message may indicate that the called terminal device is busy.

In addition, the 486 message may further include a non-idle state. The non-idle state may be specifically a busy state, and another network element may determine, based on the non-idle state, that the called terminal device is in the non-idle state.

Step 206: After receiving the 486 message, the called-side S-CSCF sends the 486 message to the TAS.

Step 207: The TAS receives the 486 message, and determines, based on the 486 message (or based on the non-idle state included in the 486 message), that the terminal B is in the busy state. In addition, the TAS queries whether the called party has customized a personalized status prompt multimedia service. If the called party has customized the personalized status prompt multimedia service, the TAS sends a 183 message to the called-side S-CSCF, where the 183 message carries an early media identifier.

The TAS sends the 183 message to the terminal A through the called-side S-CSCF, to implement audio capability negotiation between the terminal A and the terminal b. The 183 message is used to respond to the invite message sent by the terminal A in step 201. The invite message may carry an audio capability of the terminal a, and the 183 message carries an audio capability of the terminal b. This implements the audio capability negotiation between the terminal A and the terminal b.

Step 208: The called-side S-CSCF sends the 183 message to the terminal a.

Step 209: The terminal A receives the 183 message; based on the early media identifier carried in the 183 message, the terminal A restrains the terminal A from locally playing a common beep tone, and waits for the status prompt application server to play personalized status prompt multimedia. Alternatively, the common tone may be played by the TAS for the terminal a. However, because the terminal B is currently in the non-idle state rather than a normal connectable state, the common tone is not played for the terminal a. The terminal A further sends a provisional acknowledgement (prack) message to the called-side S-CSCF.

Step 210: After receiving the prack message, the called-side S-CSCF sends the prack message to the TAS.

Step 211: After receiving the prack message, the TAS sends a 200 OK message to the called-side S-CSCF in response to the prack message.

Step 212: After receiving the 200 OK message, the called-side S-CSCF sends the 200 OK message to the terminal a.

In this way, the TAS completes normal audio media negotiation with the terminal A through exchange of the 183 message/prack message in the procedure from step 207 to step 212. However, because the terminal B is currently in the non-idle state, and the terminal B has customized the personalized status prompt multimedia service, the terminal A waits for multimedia capability negotiation with the status prompt application server.

Step 213: After receiving the prack message in step 211, because the TAS has determined that the terminal B is in the non-idle state and that the terminal B has customized the personalized status prompt multimedia service, the TAS needs to trigger the multimedia capability negotiation between the status prompt application server and the terminal a. The multimedia herein include one of audio, video, or audio and video. The TAS sends a first multimedia request to the status prompt application server, where the multimedia request may be specifically an invite message that carries no session description protocol (SDP), and the invite message includes a status prompt identifier and a non-idle identifier. In this case, because the TAS does not have a multimedia capability set of the terminal a, the invite message sent by the TAS to the status prompt application server does not carry a calling-side multimedia SDP.

Specifically, a header field of the invite message may carry the status prompt identifier and the non-idle identifier. The non-idle identifier may be specifically a call busy identifier, a power-off identifier, a call waiting identifier, a call hold identifier, a network busy identifier, a network fault identifier, an incoming call barring identifier, an anti-fraud identifier, an owed restriction identifier, a terminating call barring identifier, or the like. For example, the call busy identifier is call-busy, the power-off identifier is out-of-service, and the call waiting identifier is call-waiting. For example, a contact header field of the invite message carries the status prompt identifier, for example, StatusVideo. In an alert-info header field of the invite message, alert-indication content of a service may carry the non-idle identifier. If the non-idle identifier is different, information carried in the alert-info header field may also be different. The following provides descriptions by using an example in which the alert-info header field carries a piece of specific information, for example, Alert-Info: urn: alert: service: call-busy or Alert-Info: urn: alert: service: out-of-service.

Step 214: The status prompt application server receives the first multimedia request, and sends a first multimedia response to the TAS based on the status prompt identifier, where the first multimedia response may be specifically a 200 OK message in response to the invite message. The 200 OK message carries a multimedia capability set of the status prompt application server. The multimedia capability set may be carried in a status prompt multimedia SDP. The status prompt multimedia SDP is used for multimedia capability negotiation between the status prompt application server and the terminal a, so that the status prompt application server plays multimedia for the terminal a. The multimedia capability set may be specifically an audio capability set, a video capability set, or an audio and video capability set, and the multimedia capability set may specifically include a supported audio format, a supported video format, a supported video resolution, a supported bandwidth, or the like. This is not specifically limited herein.

Step 215: After receiving the 200 OK message, the TAS sends a second multimedia request to the called-side S-CSCF, where the second multimedia request is specifically an update message carrying the status prompt multimedia SDP.

Because the TAS has sent, to the called-side S-CSCF, the 183 message carrying an audio capability set of the called terminal in step 207, and the TAS needs to trigger update of the multimedia capability negotiation between the terminal A and the status prompt application server in step 215, the called-side S-CSCF needs to send an update message including the status prompt multimedia SDP to the terminal a, to update the multimedia capability negotiation between the terminal A and the called side S-CSCF.

Step 216: The called-side S-CSCF receives the update message carrying the status prompt multimedia SDP, and sends the update message to the terminal a.

Step 217: The terminal A receives the update message, and sends a second multimedia response to the called-side S-CSCF based on the status of the terminal a, where the second multimedia response is specifically a 200 OK message in response to the update message, the 200 OK message carries the multimedia capability set of the calling terminal device, and the multimedia capability set of the calling terminal device may be carried in the calling-side multimedia SDP.

Step 218: The called-side S-CSCF receives the 200 OK message, and sends the 200 OK message to the TAS.

Step 219: The TAS receives the 200 OK message, and sends a first multimedia acknowledgement message to the status prompt application server, where the first multimedia acknowledgement message may be specifically an acknowledgement (ACK) message in response to the 200 OK message in step 214. The ACK message includes the calling-side multimedia SDP.

Through interaction between the calling-side network element and the called-side network elements in steps 214 to 219, the TAS sends the multimedia capability set of the status prompt application server to the calling terminal device. In this way, the calling terminal device can select, from the multimedia capability set of the status prompt application server, a multimedia capability set supported by the calling terminal device, and sends the selected multimedia capability set to the TAS; and then the TAS sends the selected multimedia capability set to the status prompt application server. This implements the multimedia capability negotiation between the calling terminal device and the status prompt application server. After the multimedia capability negotiation is implemented, the status prompt application server can play, for the calling terminal device, the personalized status prompt multimedia customized by the called terminal device.

Step 220: The TAS may further send a notification message to the status prompt application server, where the notification message may be specifically an INFO message.

Step 221: The status prompt application server receives the INFO message. After receiving the INFO message sent by the TAS, the status prompt application server plays corresponding status prompt multimedia based on specific content of the non-idle identifier received in step 213. For example, if the non-idle identifier indicates that the user is busy, the status prompt application server plays user-busy status prompt multimedia; or if the non-idle identifier indicates call waiting, the status prompt application server plays call-waiting status prompt multimedia. The status prompt application server sends a notification acknowledgement message to the TAS, where the notification acknowledgement message is specifically a 200 OK message for the INFO message. Steps 220 to 221 are optional. If the TAS does not send the INFO message in step 220, the status prompt application server may start playing according to a timer. For example, after receiving the ACK response including the calling-side multimedia SDP, the status prompt application server starts the timer. When the timer expires (for example, 50 milliseconds), the status prompt application server starts to play status prompt multimedia corresponding to the non-idle identifier for the terminal b. Content of the status prompt multimedia may be specifically an advertisement, a video recorded by the called party, or another personalized video.

Steps 222 to 227: A calling party hangs up the call, and the terminal A sends a cancel message to the TAS in the called-side domain; the TAS returns a 200 OK message to the calling terminal A in response to the cancel message, and sends a bye message to the status prompt application server; and the status prompt application server releases the call and sends a 200 OK message in response to the bye message.

Figure 3A:
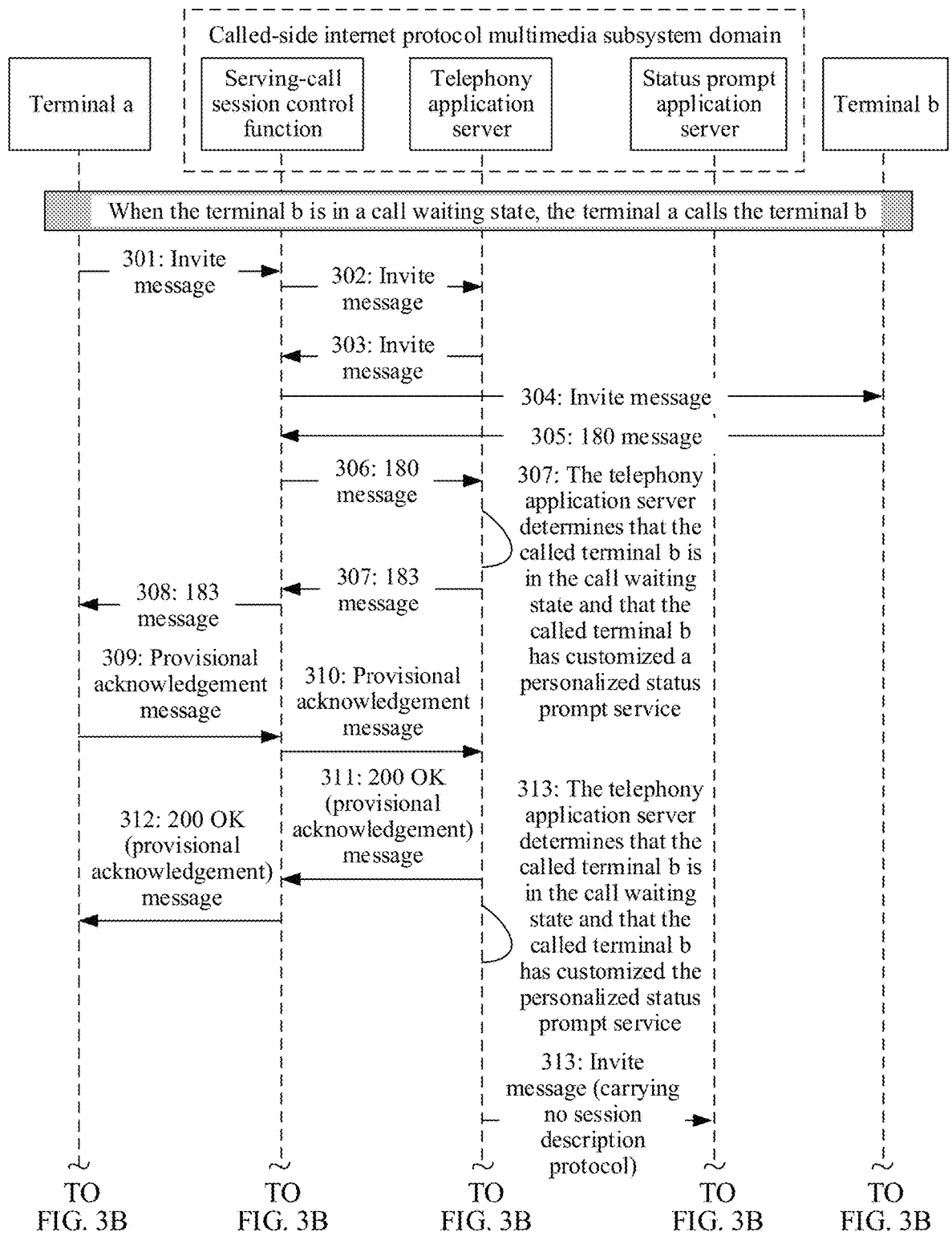
FIG. 3A and FIG. 3B are a flowchart of a status prompt playing method when a called party is in a call waiting state according to an embodiment of this application.
Figure 3B:
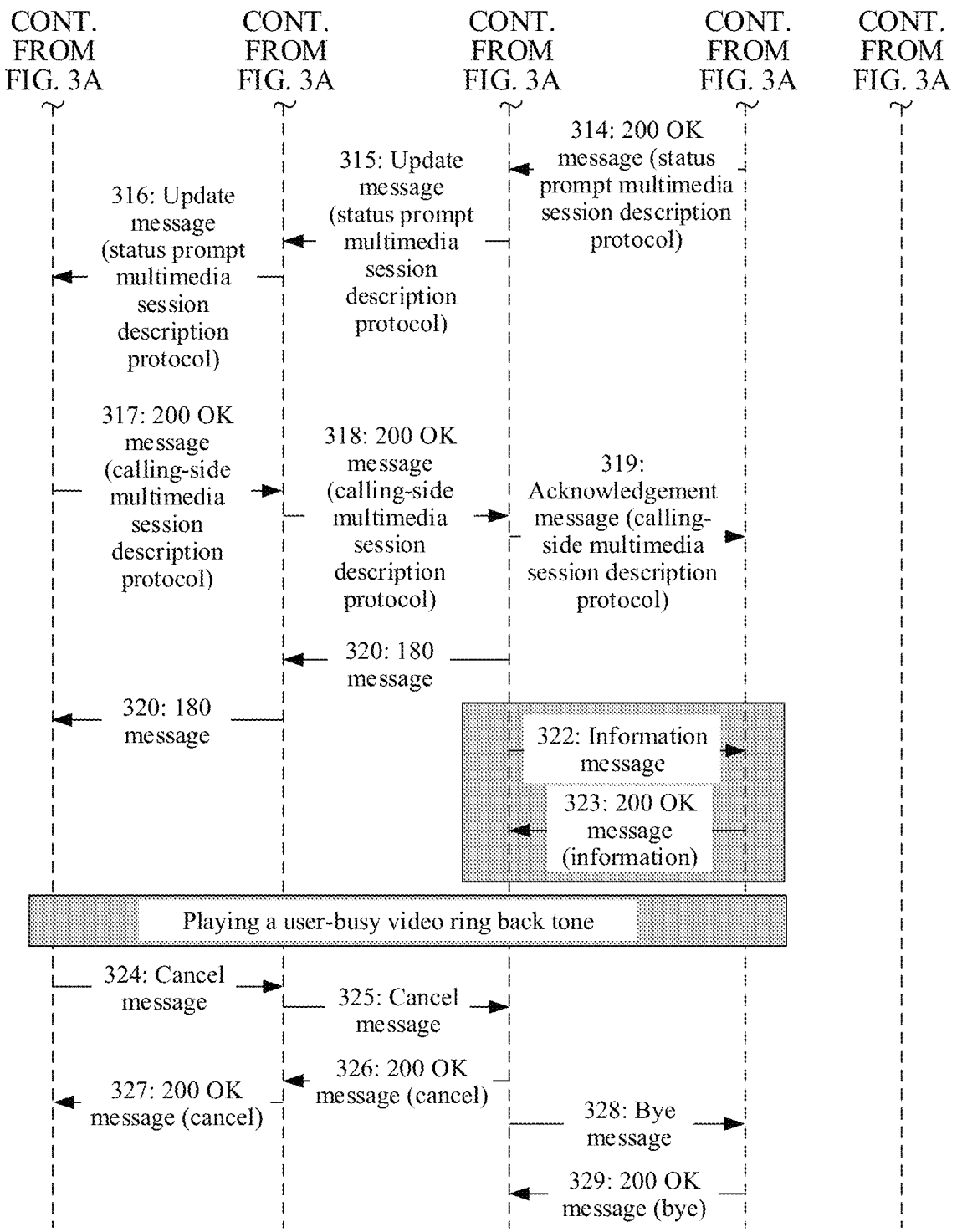

FIG. 3A and FIG. 3B show a procedure of another status prompt tone multimedia playing solution according to an embodiment of the present invention. In this embodiment, a terminal A is a calling terminal device, a terminal B is a called terminal device, and the terminal B is in a call waiting state. The procedure specifically includes the following steps.

Steps 301 to 304 are the same as steps 201 to 204. Details are not described herein again.

Step 305: After the terminal B receives the invite message, because the terminal B is in the call waiting state, the terminal B sends, to the called-side S-CSCF, a 180 message indicating call waiting, where the 180 message may include a non-idle state, and the non-idle state may be specifically the call waiting state.

Step 306: After receiving the 180 message, the called-side S-CSCF sends the 180 message to the TAS.

Step 307: The TAS receives the 180 message, and determines, based on the 180 message, that the terminal B is in the call waiting state; and the TAS sends a 183 message to the called-side S-CSCF, where the 183 message is used to normally complete audio negotiation with the calling terminal a, and the 183 message further carries an early media identifier.

Steps 308 to 319 are the same as steps 208 to 219. Details are not described herein again.

Step 320: The TAS may further send a 180 message to the called-side S-CSCF, where the 180 message is sent in response to step 306.

Step 321: The called-side S-CSCF sends the 180 message to the terminal a.

Steps 322 to 329 are the same as steps 220 to 227. Details are not described herein again.

Figure 4A:
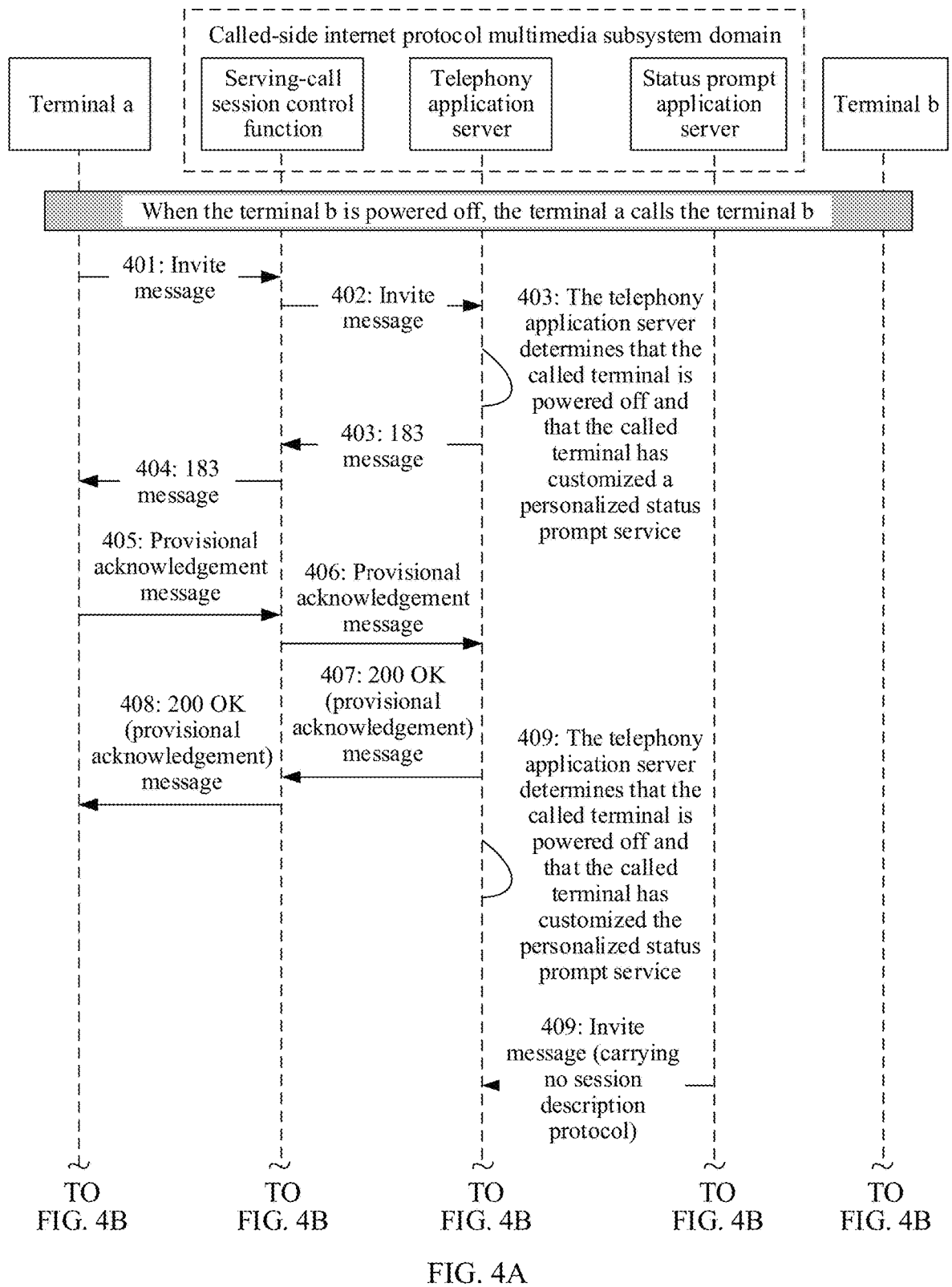
FIG. 4A and FIG. 4B are a flowchart of a status prompt playing method when a called party is in a power-off state according to an embodiment of this application.
Figure 4B:
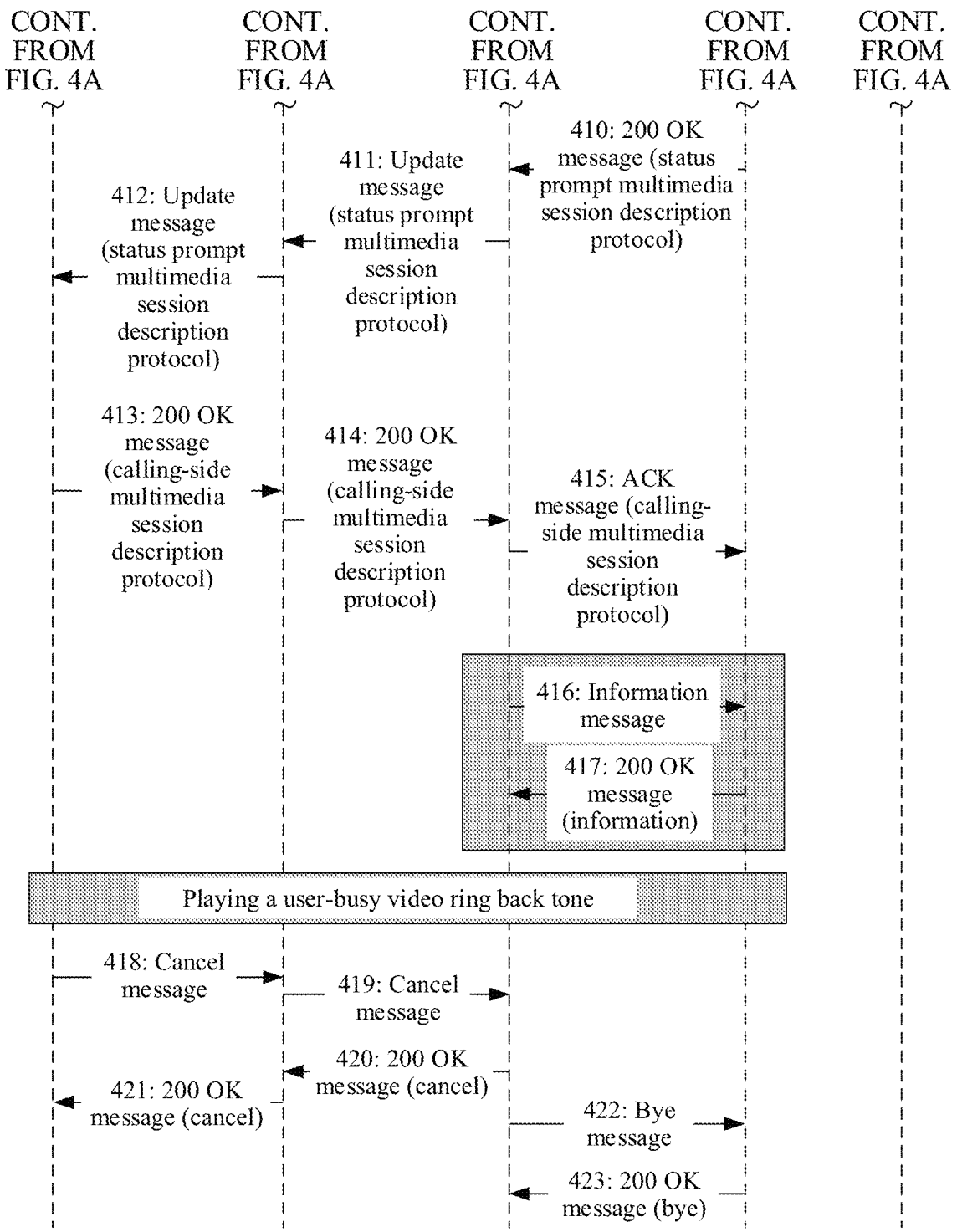

FIG. 4A and FIG. 4B show a procedure of another status prompt tone multimedia playing solution according to an embodiment of the present invention. In this embodiment, a terminal A is a calling terminal device, a terminal B is a called terminal device, and the terminal B is in a power-off state. The procedure specifically includes the following steps.

Steps 401 and 402 are the same as steps 201 and 202. Details are not described herein again.

Step 403: If the TAS determines that the terminal B is in the power-off state and that the terminal B has customized a personalized status prompt multimedia service, the TAS first normally completes media negotiation on an audio prompt tone with the calling side, and sends a 183 message to the called-side S-CSCF, where the 183 message further carries an early media identifier.

When the terminal b is powered off, in other words, the terminal B is disconnected from a wireless network, the TAS does not store registration information of a called party. When the TAS does not find the registration information of the called party, the TAS determines that the terminal B is in the power-off state.

Steps 404 to 423 are the same as steps 208 to 227. Details are not described herein again.

Figure 5:
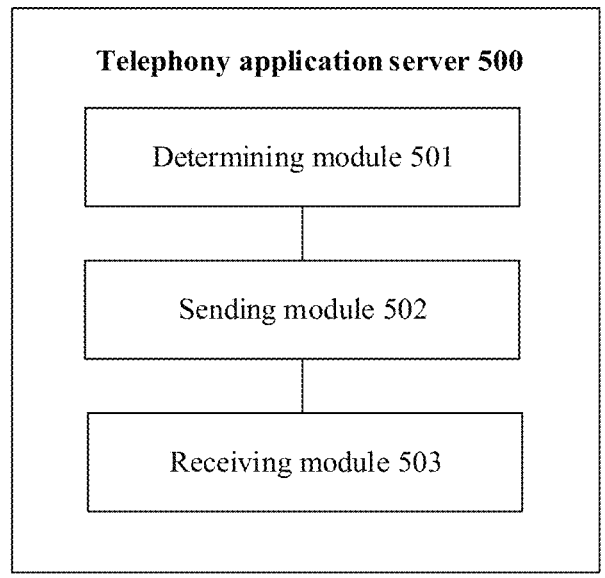
FIG. 5 is a schematic block diagram of a TAS according to an embodiment of this application.

FIG. 5 is a block diagram of an example of a TAS 500 according to an embodiment of this application. The TAS 500 may specifically include a determining module 501, a sending module 502, and a receiving module 503. The determining module 501 is configured to determine that a called terminal device is in a non-idle state and that the called party of the called terminal device has customized status prompt multimedia. The sending module 502 is configured to send a message to another network element. For example, the sending module 502 may be configured to send a first multimedia request to a status prompt application server, to implement multimedia capability negotiation between the status prompt application server and the calling terminal device, so that the status prompt application server can play the status prompt multimedia for the calling terminal device; the sending module 502 may be further configured to send a second multimedia request including a multimedia capability set of the status prompt application server to the calling terminal device; and the sending module 502 is further configured to send a first multimedia acknowledgement message to the status prompt application server, where the first multimedia acknowledgement message includes a multimedia capability set of the calling terminal. The receiving module 503 is configured to receive a specified message sent by the another network element. For example, the receiving module 503 may be configured to receive a call request sent by the calling terminal to the called terminal; the receiving module 503 is further configured to receive a first multimedia response sent by the status prompt application server, where the first multimedia response includes the multimedia capability set of the status prompt application server; and the receiving module 503 may be further configured to receive a second multimedia response sent by the calling terminal device, where the second multimedia response includes the multimedia capability set of the calling terminal device.

In some feasible embodiments, the sending module 502 may be further configured to send, to the calling terminal device, a call response including an early media identifier, to restrain the calling terminal device from playing a common tone. The sending module 502 may be further configured to send a notification message to the status prompt application server, where the notification message includes an indication of playing the status prompt multimedia. The receiving module 503 may be further configured to receive a call busy message, a call waiting message, or a call hold message sent by the called terminal device.

In some feasible implementations, when determining that the called terminal device is in the non-idle state, the determining module 501 may perform the determining in the following manner: determine, based on the call busy message or the call waiting message, that the called terminal device is in the non-idle state; or determine, based on whether the called terminal device is in a power-off state, an incoming call barring state, an anti-fraud state, an owed restriction state, or a terminating call barring state, that the called terminal device is in the non-idle state; or when a fault occurs on a network, determine that the called terminal device is in the non-idle state.

It should be noted that the modules in the TAS in this embodiment of this application are functional entities implementing various execution steps included in the status prompt multimedia playing method in this application, that is, functional entities implementing the steps related to the TAS in the status prompt multimedia playing method in this application and implementing extensions and variations of these steps. For details, refer to the descriptions of the methods in FIG. 2A and FIG. 2B to FIG. 4A and FIG. 4B in this specification. For brevity, details are not described again.

Figure 6:
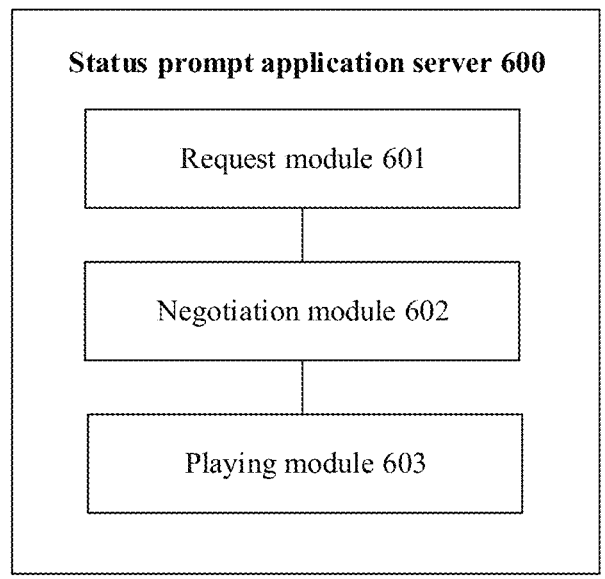
FIG. 6 is a schematic block diagram of a status prompt application server according to an embodiment of this application.

FIG. 6 is a block diagram of an example of a status prompt application server 600 according to an embodiment of this application. The status prompt application server may specifically include a request module 601, a negotiation module 602, and a playing module 603. The request module 601 may be configured to receive a first multimedia request sent by a TAS, where the first multimedia request may include a status prompt identifier and a non-idle identifier. The negotiation module is configured to implement multimedia capability negotiation with a calling terminal device. The playing module 603 may be configured to play status prompt multimedia corresponding to the non-idle identifier for the calling terminal device.

In some feasible implementations, the negotiation module 602 may be further configured to: send a first multimedia response to the TAS, where the first multimedia response includes a multimedia capability set of the status prompt application server; and receive a first multimedia acknowledgement message sent by the TAS, where the first multimedia acknowledgement message includes a multimedia capability set of the calling terminal device.

In some feasible implementations, the playing module 603 performs playing in two manners. In a first manner, the playing module 603 may receive a notification message sent by the TAS, where the notification message includes an indication of playing the status prompt multimedia; and play, according to the indication, the status prompt multimedia corresponding to the non-idle identifier for the calling terminal device. In a second manner, the playing module 603 may start a timer after receiving the first multimedia acknowledgement message; and when the timer expires, play the status prompt multimedia corresponding to the non-idle identifier for the calling terminal device.

It should be noted that the modules in the status prompt application server in this embodiment of this application are functional entities implementing various execution steps included in the status prompt multimedia playing method in this application, that is, functional entities implementing the steps related to the status prompt application server in the status prompt multimedia playing method in this application and implementing extensions and variations of these steps. For details, refer to the descriptions of the methods in FIG. 2A and FIG. 2B to FIG. 4A and FIG. 4B in this specification. For brevity, details are not described in this specification again.

Figure 7:
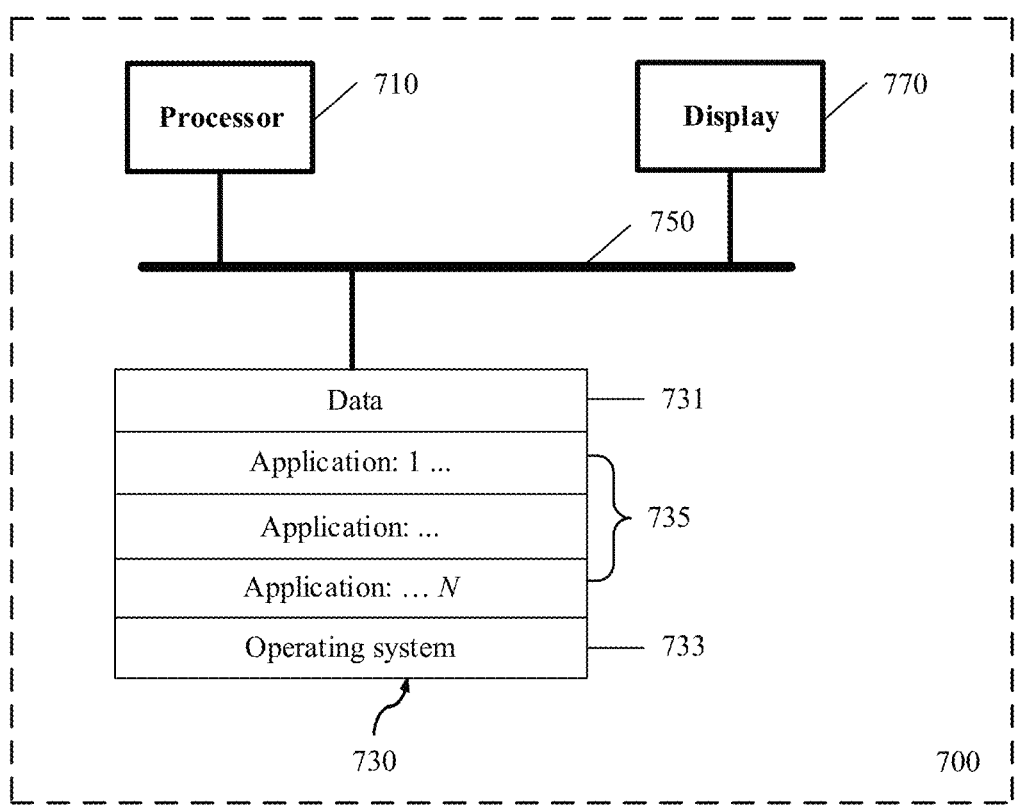
FIG. 7 is a schematic block diagram of a computing device according to an embodiment of this application.

FIG. 7 is a schematic block diagram of an implementation of a TAS or a status prompt application server (which is referred to as a computing device 700 below) according to an embodiment of this application. The computing device 700 may include a processor 710, a memory 730, and a bus system 750. The processor and the memory are connected through the bus system. The memory is configured to store an instruction. The processor is configured to execute the instruction stored in the memory. The memory of the TAS stores program code. The processor may invoke the program code stored in the memory, to perform the status prompt multimedia playing method described in this application. To avoid repetition, details are not described herein again.

In this embodiment of this application, the processor 710 may be a central processing unit ("CPU" for short), or the processor 710 may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

The memory 730 may include a read-only memory (ROM) device or a random access memory (RAM) device. Any other proper type of storage device may be alternatively used as the memory 730. The memory 730 may include code and data 731 that are accessed by the processor 710 through the bus system 750. The memory 730 may further include an operating system 733 and an application program 735. The application program 735 includes at least one program that allows the processor 710 to perform the status prompt multimedia playing method described in this application. For example, the application programs 735 may include applications 1 to N, and the applications 1 to N further include applications used to implement the status prompt multimedia playing method described in this application.

The bus system 750 may further include a power bus, a control bus, a status signal bus, and the like, in addition to a data bus. However, for clear description, various types of buses in the figure are marked as the bus system 750.

Optionally, the computing device 700 may further include one or more output devices, for example, a display 770. In an example, the display 770 may be a touch display combining a display and a touch unit that can operationally sense touch input. The display 770 may be connected to the processor 710 through the bus 750.

A person skilled in the art can understand that the functions described with reference to various illustrative logical blocks, modules, and algorithm steps disclosed in this specification may be implemented by hardware, software, firmware, or any combination thereof. If the functions are implemented by software, the functions described with reference to the illustrative logical blocks, modules, and steps may be stored or transmitted on a computer-readable medium as one or more instructions or code and executed by a hardware-based processing unit. The computer-readable medium may include a computer-readable storage medium, and the computer-readable storage medium corresponds to a tangible medium, such as a data storage medium, or a communications medium including any medium that facilitates transfer of a computer program from one medium to another medium (for example, according to a communications protocol). In this manner, the computer-readable medium may generally correspond to: (1) a non-transitory tangible computer-readable storage medium, or (2) a communications medium such as a signal or a carrier. The data storage medium may be any available medium that can be accessed by one or more computers or one or more processors to retrieve instructions, code, and/or data structures for implementing the technologies described in this application. A computer program product may include the computer-readable medium.

By way of example and not by way of limitation, such computer-readable storage media may include a RAM, a ROM, an EEPROM, a CD-ROM or another optical disk storage apparatus, a magnetic disk storage apparatus or another magnetic storage apparatus, a flash memory, or any other medium that can be used to store desired program code in a form of an instruction or a data structure and that can be accessed by a computer. In addition, any connection is properly termed as a computer-readable medium. For example, if an instruction is transmitted from a website, a server, or another remote source through a coaxial cable, an optical fiber, a twisted pair, a digital subscriber line (DSL), or wireless technologies such as infrared, radio, and microwave, the coaxial cable, the optical fiber, the twisted pair, the DSL, or the wireless technologies such as infrared, radio, and microwave are included in a definition of a medium. However, it should be understood that the computer-readable storage medium and the data storage medium do not include connections, carriers, signals, or other transitory media, but are actually non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically with lasers. Combinations of the foregoing should also be included in the scope of the computer-readable medium.

An instruction may be executed by one or more processors such as one or more digital signal processors (DSP), general-purpose microprocessors, application-specific integrated circuits (ASIC), field programmable gate arrays (FPGA), or other equivalent integrated circuits or discrete logic circuits. Therefore, the term "processor" used in this specification may be any of the foregoing structures or any other structure suitable for implementing the technologies described in this specification. In addition, in some aspects, the functions described in the illustrative logical blocks, modules, and steps described in this specification may be provided within dedicated hardware and/or software modules configured for encoding and decoding, or may be incorporated into a combined codec. In addition, the technologies may all be implemented in one or more circuits or logic elements.

The technologies in this application may be implemented in various apparatuses or devices, including a wireless handset, an integrated circuit (IC), or a group of ICs (for example, a chip set). Various components, modules, or units are described in this application to emphasize functional aspects of the apparatuses configured to implement the disclosed technologies, but are not necessarily implemented by different hardware units. Actually, as described above, various units may be combined into a codec hardware unit in combination with appropriate software and/or firmware, or may be provided by interoperable hardware units (including one or more processors described above).

The foregoing descriptions are merely example specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A status prompt multimedia playing method, comprising:
   receiving a call request sent by a calling terminal device to a called terminal device;
   receiving a call busy message, a call waiting message, or a call hold message sent by the called terminal device, and determining, based on the call busy message or the call waiting message or the call hold message, that the called terminal device is in a non-idle state;
   querying a status prompt application sever to determine that a called party of the called terminal device has customized status prompt multimedia; and
   sending, based on the determining that the called terminal device is in the non-idle state and the determining that the called party of the called terminal device has customized status prompt multimedia, a first multimedia request to the status prompt application server to implement multimedia capability negotiation between the status prompt application server and the calling terminal device, wherein the first multimedia request causes the status prompt application server to play the status prompt multimedia for the calling terminal device.

2. The method of claim 1, wherein the implementing multimedia capability negotiation between the status prompt application server and the calling terminal device comprises:
   receiving a first multimedia response sent by the status prompt application server, wherein the first multimedia response comprises a multimedia capability set of the status prompt application server;
   sending a second multimedia request comprising the multimedia capability set of the status prompt application server to the calling terminal device;
   receiving a second multimedia response sent by the calling terminal device, wherein the second multimedia response comprises a multimedia capability set of the calling terminal device; and
   sending a first multimedia acknowledgement message to the status prompt application server, wherein the first multimedia acknowledgement message comprises the multimedia capability set of the calling terminal device.

3. The method according to claim 1, further comprising:
   sending a notification message to the status prompt application server, wherein the notification message comprises an indication of playing the status prompt multimedia.

4. The method according to claim 1, wherein the first multimedia request comprises a status prompt identifier and a non-idle identifier, and wherein the non-idle identifier is a call busy identifier, a power-off identifier, a call waiting identifier, a call hold identifier, a network busy identifier, a network fault identifier, an incoming call barring identifier, an anti-fraud identifier, an owed restriction identifier, or a terminating call barring identifier.

5. The method according to claim 4, wherein the status prompt identifier is carried in a contact header field of the first multimedia request, and wherein the non-idle identifier is carried in an alert-info header field of the first multimedia request.

6. A status prompt multimedia playing method, comprising:
   receiving, by a status prompt application server and from a telephony application server, a query requesting whether a called party of a called terminal device has customized status prompt multimedia;
   sending, by the status prompt application server and to the telephony application server, a query result indicating that the called party of the called terminal device has customized status prompt multimedia;
   receiving, by the status prompt application server, a first multimedia request sent by the telephony application server, wherein the first multimedia request comprises a non-idle identifier, and wherein the first multimedia request is sent based on a determining result that the called terminal device is in the non-idle state and the query result indicating that the called party of the called terminal device has customized status prompt multimedia;
   implementing, by the status prompt application server in response to the first multimedia request carrying the non-idle identifier, multimedia capability negotiation with a calling terminal device; and
   playing, by the status prompt application server, status prompt multimedia corresponding to the non-idle identifier for the calling terminal device.

7. The method of claim 6, wherein the implementing multimedia capability negotiation with a calling terminal device comprises:
   sending, by the status prompt application server, a first multimedia response to the telephony application server, wherein the first multimedia response comprises a multimedia capability set of the status prompt application server; and
   receiving a first multimedia acknowledgement message sent by the telephony application server, wherein the first multimedia acknowledgement message comprises a multimedia capability set of the calling terminal device.

8. The method of claim 6, wherein the playing status prompt multimedia corresponding to the non-idle identifier for the calling terminal device comprises:
   receiving a notification message sent by the telephony application server, wherein the notification message comprises an indication of playing the status prompt multimedia; and
   playing, according to the indication, the status prompt multimedia corresponding to the non-idle identifier for the calling terminal device.

9. The method of claim 7, wherein the playing status prompt multimedia corresponding to the non-idle identifier for the calling terminal device comprises:
   starting a timer after receiving the first multimedia acknowledgement message; and
   when the timer expires, playing the status prompt multimedia corresponding to the non-idle identifier for the calling terminal device.

10. The method according to claim 6, wherein a status prompt identifier is carried in a contact header field of the first multimedia request, and wherein the non-idle identifier is carried in an alert-info header field of the first multimedia request.

11. A telephony application server, comprising:
    at least one processor; and
    one or more memories coupled to the at least one processor and storing programming instructions for execution by the at least one processor to:
    receive a call request sent by a calling terminal device to a called terminal device;
    receive a call busy message, a call waiting message, or a call hold message sent by the called terminal device, and determining, based on the call busy message or the call waiting message, that the called terminal device is in a non-idle state;
    querying a status prompt application sever to determine that a called party of the called terminal device has customized status prompt multimedia; and
    send, based on the determining that the called terminal device is in the non-idle state and the determining that the called party of the called terminal device has customized status prompt multimedia, a first multimedia request to a status prompt application server to implement multimedia capability negotiation between the status prompt application server and the calling terminal device, wherein the first multimedia request causes the status prompt application server to play the status prompt multimedia for the calling terminal device.

12. The telephony application server according to claim 11, wherein the one or more memories stores the programming instructions for execution by the at least one processor to further to:
    receive a first multimedia response sent by the status prompt application server, wherein the first multimedia response comprises a multimedia capability set of the status prompt application server;
    send a second multimedia request comprising the multimedia capability set of the status prompt application server to the calling terminal device;
    receive a second multimedia response sent by the calling terminal device, wherein the second multimedia response comprises a multimedia capability set of the calling terminal device; and
    send a first multimedia acknowledgement message to the status prompt application server, wherein the first multimedia acknowledgement message comprises the multimedia capability set of the calling terminal device.

13. The telephony application server according to claim 11, wherein the one or more memories stores the programming instructions for execution by the at least one processor further to send a notification message to the status prompt application server, wherein the notification message comprises an indication of playing the status prompt multimedia.

14. The telephony application server according to claim 11, wherein the first multimedia request comprises a status prompt identifier and a non-idle identifier, and wherein the non-idle identifier is a call busy identifier, a power-off identifier, a call waiting identifier, a call hold identifier, a network busy identifier, a network fault identifier, an incoming call barring identifier, an anti-fraud identifier, an owed restriction identifier, or a terminating call barring identifier.

15. The telephony application server according to claim 14, wherein the status prompt identifier is carried in a contact header field of the first multimedia request, and wherein the non-idle identifier is carried in an alert-info header field of the first multimedia request.

16. A status prompt application server, comprising:
    at least one processor; and
    one or more memories coupled to the at least one processor and storing programming instructions for execution by the at least one processor to:

receive, from a telephony application server, a query requesting whether a called party of a called terminal device has customized status prompt multimedia;

send, to the telephony application server, a query result indicating that the called party of the called terminal device has customized status prompt multimedia;

receive a first multimedia request sent by a telephony application server, wherein the first multimedia request comprises a non-idle identifier, and wherein the first multimedia request is sent based on a determining result that the called terminal device is in the non-idle state and the query result indicating that the called party of the called terminal device has customized status prompt multimedia;

implement, in response to the first multimedia request carrying the non-idle identifier, multimedia capability negotiation with a calling terminal device; and play status prompt multimedia corresponding to the non-idle identifier for the calling terminal device.

17. The status prompt application server according to claim 16, wherein the one or more memories stores the programming instructions for execution by the at least one processor further to:

send a first multimedia response to the telephony application server, wherein the first multimedia response comprises a multimedia capability set of the status prompt application server; and receive a first multimedia acknowledgement message sent by the telephony application server, wherein the first multimedia acknowledgement message comprises a multimedia capability set of the calling terminal device.

18. The status prompt application server according to claim 16, wherein the one or more memories stores the programming instructions for execution by the at least one processor further to:

receive a notification message sent by the telephony application server, wherein the notification message comprises an indication of playing the status prompt multimedia; and play, according to the indication, the status prompt multimedia corresponding to the non-idle identifier for the calling terminal device.

* * * * *

UNITED STATES PATENT AND TRADEMARK OFFICE
CERTIFICATE OF CORRECTION

PATENT NO. : 11,509,767 B2
APPLICATION NO. : 17/200285
DATED : November 22, 2022
INVENTOR(S) : Zhilei Deng et al.

It is certified that error appears in the above-identified patent and that said Letters Patent is hereby corrected as shown below:

In the Claims

In Column 16, In Line 21, In Claim 1, delete "sever" and insert -- server --.

In Column 18, In Line 11, In Claim 11, delete "sever" and insert -- server --.

Signed and Sealed this
Second Day of May, 2023

Katherine Kelly Vidal
*Director of the United States Patent and Trademark Office*